United States Patent
Mohacsi

Patent Number: 5,200,233
Date of Patent: Apr. 6, 1993

[54] METHOD OF APPLYING PHOSPHOR PARTICLES TO SURFACES

[75] Inventor: Ference Mohacsi, Chatham, United Kingdom

[73] Assignee: Masonlite Limited, United Kingdom

[21] Appl. No.: 592,189

[22] Filed: Oct. 3, 1990

[30] Foreign Application Priority Data

Oct. 7, 1989 [GB] United Kingdom ............... 8922809

[51] Int. Cl.$^5$ .............................................. B05D 5/06
[52] U.S. Cl. ........................................ 427/67; 427/73; 427/157
[58] Field of Search .................. 427/64, 65, 66, 67, 427/73, 157; 250/483.1, 484.1 A, 484.1 B, 484.1 R; 313/485; 428/690; 976/DIG. 439; 106/20, 23

[56] References Cited

U.S. PATENT DOCUMENTS

| | | | |
|---|---|---|---|
| 3,533,827 | 10/1970 | Rimbach | 220/2.1 R |
| 4,122,370 | 10/1978 | Barnes | 252/301.4 F |
| 4,455,323 | 6/1984 | Ishizuka et al. | 427/73 |
| 4,825,084 | 4/1989 | Braunlich et al. | 250/484.1 A |
| 4,922,105 | 5/1990 | Hosoi | 976/DIG. 439 |

FOREIGN PATENT DOCUMENTS

| | | |
|---|---|---|
| 2113240 | 12/1971 | Fed. Rep. of Germany . |
| 2249867 | 4/1973 | Fed. Rep. of Germany ........ 427/66 |
| 2041262 | 1/1971 | France . |
| 58-34887 | 8/1981 | Japan . |
| 735633 | 3/1952 | United Kingdom . |
| 952280 | 12/1962 | United Kingdom . |
| 1069187 | 6/1965 | United Kingdom . |
| 1147763 | 4/1966 | United Kingdom . |

*Primary Examiner*—Shrive Beck
*Assistant Examiner*—Terry J. Owens
*Attorney, Agent, or Firm*—W. Thad Adams, III

[57] ABSTRACT

Phosphor coatings for use in mercury discharge tubes and glass plates for illuminated signboards are provided by applying phosphor particles to a surface by means of a binder. The phosphor and an inorganic binder are suspended in a volatile fluid. The suspension is used to coat the surface. Evaporation at a temperature not exceeding 175° C. is used to remove the volatile fluid.

5 Claims, 1 Drawing Sheet

METHOD OF APPLYING PHOSPHOR PARTICLES TO SURFACES

FIELD OF THE INVENTION

The present invention concerns improvements in or relating to illuminating arrangements, particularly but not exclusively mercury discharge tubes and glass plates which are subjected to radiation to produce illuminated signboards.

BACKGROUND TO THE INVENTION

Known tubes, for example hot cathode and cold cathode low pressure mercury discharge tubes, have a phosphor coating on their internal surface which, when subjected to a gas mercury vapour discharge rich in ultra violet radiation provide a light output in the visible spectrum.

The current coating method employed in manufacturing the tubes involves mixing an organic binder, for example nitro cellulose and ethyl cellulose, in a solvent or blend of solvents such as xylene or butyl acetate. When the solution obtains a pre-determined viscosity phosphor is blended into it and the resulting suspension is used to coat the inside of the glass tube by up flush or down flush methods. The coating is dried by passing air through the tube to remove the solvent and when fully dry the tubes are heated to a high enough temperature to combust the organic binder in the presence of air, oxygen, or air enriched with oxygen so that all the organic carrier material is burnt off leaving a phosphor coating on the tube held in place by an inorganic binder.

This method is disadvantageous in that it requires the input of a considerable amount of energy to burn off the organic materials and often results in damage to the glass tubes as a result of the elevated temperatures to which they are subjected during the burn-off operation. Additionally the organic materials are lost during the burning off process.

Known glass plate displays also have disadvantages in respect of their coatings. In these displays a printing medium including phosphors and a binder is screen printed onto the glass but prior printing media are disadvantageous in that the phosphor particles are only loosely bound to the glass by the binder and consequently coated glass plates must be handled with particular care, especially when it is borne in mind that the coated surface is exposed and consequently prone to damage. Additionally, if any organic material is intermixed with the phosphors it decomposes during the exposure, in use, to high intensity ultra-violet radiation and has the effect of discolouring the phosphor and reducing the light output. Separate areas printed with different phosphors to give different coloured light may also intermingle giving an illuminated effect of poor quality.

It is an object of the present invention to obviate or mitigate these disadvantages.

In the present specification the term fumed silica is intended to refer to a colloidal product produced by the hydrolysis of silicon tetrachloride vapour in a flame of hydrogen and oxygen at approx. 1800° C. The term aluminum oxide C is intended to refer to a product produced by flame hydrolysis of anhydrous aluminum chloride.

SUMMARY OF THE INVENTION

The present invention provides a method of applying phosphor particles to a surface by means of a binder, comprising suspending the phosphor and inorganic binder in a volatile fluid and coating the surface with the suspension, the fluid being removed by evaporation at a temperature not exceeding 175° C.

Preferably, at least one volatile solvent is blended with a binder including fumed silica and aluminum oxide C to form a coating medium, the medium further comprising phosphor, and the medium is allowed to pass over a glass surface to be coated to leave a coating thereon, and drying the coating to remove the volatile solvent such that the dried coating comprises no organic materials.

Preferably methanol and/or acetone are used as a solvent. Preferably a blend of solvents is used. The solvents may be chosen to produce a medium which may be applied to the surface in a fluent gel form which liquifies during the coating action.

The proportions of the components of the medium are preferably predetermined to control the coating thickness produced by the medium.

Preferably the volatile solvents removed from the medium during the drying process are recovered, re-condensed and re-used.

Preferably the viscosity of the medium is determined by varying one or more of the following; the type of solvent(s), the ratio of solvents, the ratio of binder materials to each other, the ratio of binder materials to solvents, the sheer force to which the suspension is subjected during mixing and application.

An inorganic binding material may be suspended in a volatile solvent, phosphor and organic carrier are added to the suspension, and the volatile solvent is removed to produce a phosphor-containing printing medium, printing the medium onto the surface to be coated and drying-off the organic carrier at a temperature no greater than 175° C.

Preferably the volatile solvent is methanol, and preferably the inorganic binder is barium peroxide.

Preferably the organic carrier is glycerol.

The viscosity of the medium may be controlled as aforesaid.

BRIEF DESCRIPTION OF THE DRAWING

Embodiments of the present invention will now be described by way of example only, and by reference to the accompanying drawing, in which.

DETAILED DESCRIPTION OF THE EMBODIMENTS

EXAMPLE 1

Figure 1:
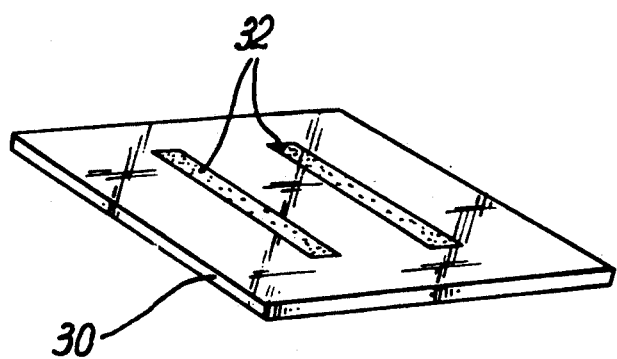
FIG. 1 is a schematic perspective view of a glass plate coated in accordance with the invention.

This example comprises a method of coating hot or cold cathode low pressure mercury discharge tubes with phosphors. To a blend of methanol and acetone there is added a small predetermined percentage of fumed silica and aluminum oxide C together with a pre-determined amount of phosphor particles, the resultant coating medium being thixotropic (or pseudo-plastic). A measured amount of the medium is then presented to the base of an upstanding glass tube to be coated and by applying a pressure to a base of the plug of medium in the tube it is flushed to the top of the tube then allowed to drain back to the bottom of the tube. The medium is applied in a high viscosity form and as a result of the sheering action during its travel along the tube the viscosity reduces thereby giving a coating, the thickness of which is dependent on the composition of the coating.

This process takes place in a closed chamber. Air is then passed through the tube and chamber through pipework. This removes the volatile solvents which are collected and recondensed for re-use, leaving on the walls of the tube a phosphor coating bound in place by the combined fumed silica and aluminium oxide C.

It should be realised that the coating remaining on the tube after totally drying off the volatile solvents contains no organic material, thus the normal burning off step involving the input of considerable energy is not required and furthermore there is no possibility of the phosphor particles being contaminated by organic material which would have the effect of discolouring the phosphors and reducing the light emission.

The coated tube may be used to construct a mercury discharge tube which is otherwise conventional.

Various other volatile solvents may be employed provided that they are compatable with the phosphors and the binding materials and that they can be evaporated off in a reasonably short working time at relatively low temperatures, that is temperatures below 175° C.

In the example set out above, solvents are used in the following proportions by weight:

| Solvents | |
|---|---|
| Methanol | 50% |
| Acetone | 50% |

A mix of binders and phosphors having the following proportions by weight is then prepared and added to the solvents:

| Binders | |
|---|---|
| Fumed Silica (for example CABO-SIL from Cabot Corp) | 2% |
| Aluminium Oxide C (Degussa AG) | 2% |
| Phosphors | 96% |

Inorganic phosphors are used, preferably of a type stimulated by shortwave ultraviolet light, or electrons.

The above ingredients were blended for 20 minutes in a stirrer rotating at 250 rev/min.

EXAMPLE 2

In this example there is provided a flat glass plate 30 (FIG. 1) which is intended to be subjected to shortwave UV radiation for the purpose of providing an illuminated electronically controlled sign board.

It is convenient that a phosphor containing ink is provided such that screen printing techniques can be used to deposit the ink on the plate over designated areas 32, different phosphors being used in different areas to provide different colours when the screen is illuminated. It is important that the phosphor has a good adhesion to the glass plate 30 as the plates will be subjected to a certain amount of handling and the colours must remain distinctly separate. It is important also that, in use, no organic material is intermingled with the phosphor particles as the UV radiation would decompose the organic material and discolour the phosphor, drastically reducing its light output.

The method of producing ink for use in the present example comprises suspending very small particles of a binder material, barium peroxide, in methanol. Glycerol and phosphor particles are mixed with the suspension and thereafter the methanol is evaporated off to leave an ink-like medium suitable for use in screen printing. Normal screen printing techniques are then employed and, after printing, the plate is placed in an environment with a temperature of around 150° C. so that the glycerol is completely evaporated off resulting in a layer of phosphor in the areas 32, having an accurately controllable thickness (controlled by the ratio of binder to phosphor, or glycerol to phosphor) which is bound by barium peroxide which gives exceptionally good adhesion to the glass and contains no organic material.

In the example given above the following percentages of material by weight are utilised:

| | |
|---|---|
| Barium peroxide | 3.5% |
| Methanol | 6.5% |
| Glycerol | 26% |
| Phosphor | 64%. |

Alternative solvents may be employed, for example acetone. Alternative binding materials may be employed for example, fumed silica, aluminium oxide C, strontium or calcium oxides or strontium or calcium peroxides. Suitable substitutes for glycerol may also be employed.

In particular applications of the above examples, it may be desired to incorporate barium peroxide from the ink of Example 2 into the coating of Example 1, in order to improve the adhesion of the phosphors to the tube. It may be desired to incorporate the binders from the coating of Example 1 into the ink of Example 2, in order to increase the viscosity of the ink.

I claim:

1. A method of applying phosphor particles to a surface, said method utilizing an inorganic binder material between said phosphor particles and said surface, said method comprising:
    (a) suspending said inorganic binder material in a volatile solvent to produce a suspension;
    (b) adding phosphor particles and an organic volatile carrier to the suspension;
    (c) removing the volatile solvent from the suspension to produce a printing medium containing phosphor particles;
    (d) coating said printing medium onto a surface by printing; and
    (e) removing the organic volatile carrier from the printing medium at a temperature no greater than 175° C.

2. The method of claim 1, wherein said volatile solvent is methanol.

3. The method of claim 1, wherein said inorganic binder is barium peroxide.

4. The method of claim 1, wherein said organic carrier is glycerol.

5. The method of claims 1, 2, 3 or 4, wherein said printing medium has a viscosity which is controlled by varying at least one factor from the set of factors consisting of the composition of the solvent, the composition of the binder material, the ratio of binder material to solvent, and the shear force to which the suspension and printing medium are subjected during steps (a) through (d).

* * * * *